United States Patent Office 3,493,593
Patented Feb. 3, 1970

3,493,593
ORGANIC-SOLUBLE PHENYLMERCURY SALTS OF ALKYLBENZOIC ACIDS AND PRODUCT
Otto S. Kauder, Jamaica, N.Y., assignor to Argus Chemical Corporation, Brooklyn, N.Y., a corporation of Delaware
No Drawing. Filed Dec. 30, 1966, Ser. No. 606,030
Int. Cl. C07f *3/12;* C09d *5/14;* C08h *9/00*
U.S. Cl. 260—433  3 Claims

ABSTRACT OF THE DISCLOSURE

This invention relates to phenylmercury salts of alkylbenzoic acids which are soluble in water-immisible organic solvents and therefore can be formulated as concentrated solutions that are useful for antimicrobial purposes. These phenylmercury salts are particularly useful in the form of concentrated solutions as additives to paints where they impart the well-known biocidal properties of phenylmercury compounds.

---

Phenylmercury salts of organic acids are well known for their biocidal properties. Such aryl mercury salts include the aryl mercury salts of interconnected and condensed polynuclear mono- and polybasic acids and their substituted derivatives, such as diphenic acid, benzillic acid, gallotannic acid, and 3-hydroxy-2-naphthoic acid, as set out in U.S. Patent No. 2,056,161, dated Oct. 6, 1936; the aromatic mercury salts of hydroxy-substituted aromatic mononuclear carboxylic acids, such as salicyclic acid, parahydroxy benzoic acid, 3,4-dihydroxy benzoic acid, and 2-methyl-3-hydroxy benzoic acid, as disclosed in U.S. Patent No. 2,059,195, dated Nov. 3, 1936; the aromatic mercury salts of hydroxy-substituted mononuclear aromatic acids as disclosed in U.S. Patent No. 2,074,040, dated Mar. 16, 1937; the aryl mercuric salts of benzene carboxylic acids such as benzoic acid, polybasic aromatic acids, such as phthalic acid, trimesic acid, and benzenepentacarboxylic acid, as disclosed in U.S. Patent No. 2,084,311, dated June 22, 1937; aromatic mercury derivatives of aromatic acids containing a saturated side chain to which the aromatic mercury radical is attached, including mandelic acid, tropic acid, and phenylacetic acid, as disclosed in U.S. Patent No. 2,085,063, dated June 29, 1937; aromatic mercury salts of substituted and unsubstituted unsaturated carboxylic acids, such as acrylic acid, crotonic acid, angelic acid, and atropic acid, as disclosed in U.S. Patent No. 2,114,011, dated Apr. 12, 1938, each of the aforementioned patents being issued to one Carl N. Andersen; aryl mercuric acid amides, as disclosed in U.S. Patent No. 2,336,359 to Kharasch, dated Dec. 7, 1943; and aryl mercury salts of aromatic carboxylic acids which include benzoic acid, chlorobenzoic acid, hydroxybenzoic acid, nitrobenzoic acid and aminobenzoic acid, as disclosed in U.S. Patent No. 3,140,304 to Chodsky et al.

U.S. Patent No. 2,692,204 to Nowak, dated Oct. 19, 1954 relates to organo-mercury compounds possessing high microbicidal efficacy which compounds have the following general formula:

RHgOOC—CH$_2$—CHR″—COOHgR′ wherein R and R′ can be aryl, alkyl, aralkyl or alicyclic linked directly to a mercury atom through a carbon atom, and R″ is a carbon atom chain of at least five carbon atoms. An example of such an organo-mercury compound is di(tolylmercury) dodecenyl succinate which Nowak indicates is soluble in toluene, turpentine, xylol, mineral spirits and linseed oil.

U.S. Patent No. 2,846,349 to Erskine et al. relates to aryl mercury salts of naphthenic and fatty acids, which aryl mercury compounds contain more than 1.2 equivalents of the acid or acid salt and have the formula Ar—Hg—A·*n*(H—A)

wherein Ar is an aryl group, A is an anion of a weak monobasic acid such as benzoic acid, and *n* is greater than 0.2. Erskine et al. indicate that their compounds are readily dispersible in water and oil systems.

In accordance with the present invention, it has been found that phenylmercury salts of alkylbenzoic acids are highly soluble in water-immiscible organic solvents, in contrast to the salts of benzoic acid, which contains no alkyl substituents and which has only a very small solubility in such solvents. Thus, the aryl mercury salts of alkylbenzoic acids of the invention can be formulated as highly concentrated solutions that are valuable as additives to paints where they impart the well-known biocidal properties of phenylmercury compounds. The phenylmercury salts of the invention have the formula

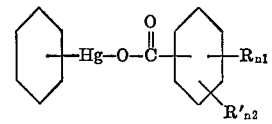

wherein R is an alkyl radical having from about one to about twenty-four carbon atoms, and $n_1$ is an integer from one to five. Additional inert substituents R′ such as halogen, acyloxy and alkoxy having from one to six carbon atoms, and nitro groups can also be present. $n_2$ is an integer from zero to four, the sum of $n_1$ and $n_2$ being a maximum of five.

Exemplary alkyl substituents are methyl ethyl, propyl, isopropyl, n-butyl, sec-butyl, tert-butyl, isobutyl, amyl, isoamyl, hexyl, heptyl, n-octyl, iso-octyl, tert-octyl, 2-ethylhexyl, nonyl, mixed nonyl from propylene trimer, decyl, undecyl, dodecyl, sec-dodecyl, mixed dodecyl from propylene tetramer, tridecyl, tetradecyl, pentadecyl, hexadecyl, heptadecyl, octadecyl, nonadecyl and behenyl.

Examples of halogen substituents are fluorine, chlorine, bromine and iodine.

Examples of alkoxy substituents are methoxy, ethoxy, (2-ethoxy)ethoxy, butoxy, pentoxy and hexoxy.

Examples of acyloxy substituents are acetyloxy, propionyloxy, n-butyryloxy, n-valeryloxy and caproyloxy.

Typical alkylaromatic acids which can be employed in preparing the phenylmercury salts of the invention are the o-, m- and p-alkylbenzoic acids wherein the alkyl substituent is any of those set out above. Mixtures of two or more such acids can also be used.

The alkyl aromatic acids can contain more than one alkyl substituent. Examples of such acids include 2-methyl-4-ethylbenzoic acid,
2-methyl-5-propylbenzoic acid,
3-ethyl-4-butylbenzoic acid,
2-metyhl-4-butylbenzoic acid,
2-methyl-4-tert-butylbenzoic acid,
2-methyl-3-ethyl-5-isoamylzenzoic acid,
3-propyl-4-(2-ethylhexyl) benzoic acid, and
3-methyl-5-tert-octylbenzoic acid.

Examples of the compounds of the invention having the above formula and which are soluble in water-immiscible organic solvents include phenylmercury p-tertiary-butylbenzoate,
phenylmercury o-methylbenzoate,
phenylmercury m-methylbenzoate,
phenylmercury p-methylbenzoate,
phenylmercury p-ethylbenzoate,
phenylmercury o-propylbenzoate,
phenylmercury 2-methyl-3-acetyloxybenzoate, phenylmercury m-isopropylbenzoate,
phenylmercury 2,4-dimethylbenzoate,
phenylmercury 3-methyl-5-tertiarybutylbenzoate,
phenylmercury 2-butyl-3-pentylbenzoate,
phenylmercury p-amylbenzoate,
phenylmercury o-hexylbenzoate,
phenylmercury 2-ethylhexylbenzoate,
phenylmercury p-decylbenzoate,
phenylmercury 2-methyl-3-nitrobenzoate,
phenylmercury 2,4,6-trimethylbenzoate,
phenylmercury 2,4,5,6-tetramethylbenzoate,
phenylmercury 2,4-diethylbenzoate,
phenylmercury 2-methyl-4-chlorobenzoate,
phenylmercury 2,4-dibromo-6-methylbenzoate,
phenylmercury 2-ethyl-4-ethoxybenzoate and
phenylmercury 2-hexoxy-4-hexylbenzoate.

The phenylmercury salts of the invention can be prepared by known procedures. For example, phenylmercury hydroxide and the appropriate alkylbenzoic acid can be heated under reflux to a temperature within the range from about 80 to about 90° C. whereupon the corresponding phenylmercury salt of an alkylbenzoic acid is formed in accordance with the following equation:

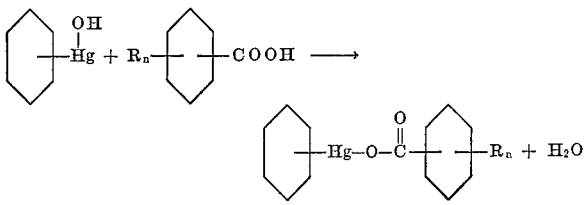

The reaction can be carried out in the presence of an azeotropic solvent such as benzene which takes up the phenylmercury salt formed and azeotropically separates the water formed in the reaction in a water trap in the reflux return line. The water of reaction can also be removed by vacuum distillation, with or without a solvent.

The phenylmercury salts of the invention can also be prepared by the metathetical reaction of a phenylmercury salt of a strong acid such as phenylmercury chloride, phenylmercury bromide, or phenylmercury nitrate, with an aqueous solution of an alkali metal or ammonium salt of an alkylaromatic acid. This reaction can be carried out in dilute aqueous solution at room temperature. However, if a fast reaction is desired, the reaction mixture can be heated. Temperatures of from about 50 to about 250° C., but below decomposition temperature of any of the components o fthe reaction, can be used.

The alkali metal or ammonium salt of the desired alkylaromatic acid can be the sodium, potassium or ammonium salt of any of the alkylaromatic acids set out above.

Another method that can be employed in preparing the phenylmercury salts of the invention comprises reacting a phenylmercury salt of an organic acid, for example, phenylmercury acetate, with the desired alkylbenzoic acid at temperatures of from about 80 to 85° C., and thereafter removing the acetic acid or other acid, taking it up in warm water or by distilling it out under a vacuum.

These phenylmercury salts can also be prepared in crystalline form in substantially quantitative yield by reacting phenylmercury acetate with an alkali metal salt of the desired alkylbenzoic acid by heating the reaction mixture in an aqueous solution to a temperature within the range from about 30° C. to about 65° C. until substantially all of the phenylmercury acetate has been converted to the phenylmercury salt of the alkylbenzoic acid. The product is then separated from the reaction mixture by filtration or other suitable procedure, washed with water, and dried. This process is set out in more detail in U.S. Patent No. 3,140,304 to Chodsky et al., dated July 7, 1964.

The phenylmercury salts of the instant invention are highly soluble in water-immiscible organic solvents. Accordingly, these salts can be dispersed in organic solvents such as, for example, benzene, carbon tetrachloride, nitrobenzene, chlorobenzene, toluene, octane, heptane, hexane, petroleum ether, naphthenic hydrocarbons, xylene, VM and P naphtha, mineral spirits, Cyclosol, Varsol, meistylene, and ethylbenzene, and various commercial hydrocarbon mixtures employed as an additive for paints. Furthermore, the phenylmercury salts of the invention are particularly useful neat and in the form of solvent free solutions in drying oils such as linseed oil, tung oil, and synthetic paint vehicles such as the well known alkyd and acrylic resins.

The following table illustrate the solubility of various phenylmrecury salts of alkylbenzoic acids, phenylmercury salt of unsubstituted benzoic acid and phenylmercury salts of other acids, in xylene.

TABLE I

| Phenylmercury salts of alkylbenzoic acids | Percent Hg in salt (Neat) | Solubility phenylmercury salt per 100 g. solution in xylene | Solubility g. Hg/per 100 g. solution in xylene |
| --- | --- | --- | --- |
| Phenylmercury o-methylbenzoate | 48.5 | 32.8 | 15.1 |
| Phenylmercury m-methylbenzoate | 48.5 | 30.1 | 14.6 |
| Phenylmercury p-methylbenzoate | 48.5 | 22.2 | 10.8 |
| Phenylmercury methylbenzoate (mixed isomers) | 48.5 | 40.7 | 19.5 |
| Phenylmercury p-tert-butylbenzoate | 44.1 | 42.4 | 18.7 |
| Phenylmercury salt of unsubstituted benzoic acid | 50.4 | <5.95 | 3.0< |
| Phenylmercury salts of non-aromatic acids: | | | |
| Phenylmercury laurate | 42.1 | L7.1 | <3.0 |
| Phenylmercury caproate | 51.0 | <5.9 | <3.0 |
| Phenylmercury caprylate | 47.6 | <6.3 | <3.0 |
| Phenylmercury caprate | 44.6 | <6.8 | <3.0 |
| Phenylmercury azelate | 53.0 | <5.7 | <3.0 |

From the above table it is clearly seen that the phenylmercury salts of alkylbenzoic acids are highly soluble in xylene, whereas the phenyl-mercury salts of unsubstituted benzoic acid and the non-aromatic acids have a low solubility in xylene.

The phenylmercury salts of the invention can be formulated as highly concentrated solutions upon mixture with organic solvents, such as those set out above, to produce a concentrated solution or additive containing from about 10 to about 60% by weight of the phenylmercury salt, and are applicable to all antimicrobial uses of the aryl mercury compounds of the prior art. The phenylmercury salts of the invention are particularly valuable as additives to both water-base and oil-base paints. They act to preserve pigment paste and paint and are effective in both the storage container and the finished paint film. Furthermore, the products of the invention are useful in paints which are ordinarily applied to surfaces which are subject to bactericidal or fungicidal deterioration and in marine paints to prevent growth of weeds, algae, and the like. Furthermore, such phenylmercury compounds can be employed as additives for paper to prevent deterioration produced by bacteria and fungi, and as seed disinfectants to prevent mold growth.

The following examples in the opinion of the inventor represent the best embodiments of his invention.

EXAMPLE 1

Phenylmercury p-methylbenzoate was prepared as follows.

A suspension of phenylmercury acetate (33.7 g., 0.1 mole) in 400 ml. of water was warmed to 75° C. and p-methylbenzoic acid (13.6 g., 0.1 mole) was added with stirring, and heating continued at temperatures within the range from 75 to 85° C. for about three hours. As the reaction proceeded, droplets or crystals of the aromatic acid and the phenylmercury acetate powder gradually disappeared and were replaced by heavy oil (or solid) at the bottom of the reaction vessel. At the end of the reaction period, the mixture was transferred to a separatory funnel containing 500 ml. of benzene which took up the phenylmercury salt almost immediately. The salt was found to be phenylmercury p-methylbenzoate.

The benzene layer was separated, filtered to remove any remaining solids, and evaporated to give the phenylmercury p-methylbenzoate as a damp crystalline solid. This solid was redissolved in xylene to provide upon dissolution a solution containing approximately 20% mercury in the form of the phenylmercury p-methylbenzoate. The solution so-obtained was filtered and analyzed for the concentration of phenylmercury salt remaining in solution by titration with a standardized solution of hydrogen bromide in acetic acid. The solution was found to contain about 10.8% mercury in the form of about 16.5 grams of phenylmercury p-methyl-benzoate in 58.7 g. of xylene and thus is about 22.2% soluble in xylene at 25°C.

Phenylmercury benzoate was prepared in accordance with the above procedure employing phenylmercury acetate (33.7 g., 0.1 mole) and benzoic acid (12.2 g., 0.1 mole). The phenylmercury benzoate was obtained as a damp crystalline solid which was added to xylene with stirring. The xylene after being filtered was found to contain less than 3% mercury in 626.3 grams xylene.

From the above data, it is readily seen that the phenylmercury salts of the alkylbenzoic acids are highly soluble in xylene, whereas the phenylmercury salt of benzoic acid had a low solubility in xylene corresponding to mercury concentrations of less than 3%.

EXAMPLE 2

Phenylmercury m-methylbenzoate was prepared as follows.

A suspension of phenylmercury acetate (33.7 g., 0.1 mole) in 400 ml. of water was warmed to 75° C. and m-methylbenzoic acid (13.6 g., 0.1 mole) was added with stirring and heating continued at temperatures within the range from 75 to 85° C. for about three hours. As the reaction proceeded, droplets or crystals of the aromatic acid and the phenylmercury acetate powder gradually disappeared and were replaced by heavy oil (or solid) at the bottom of the reaction vessel. At the end of the reaction period, the mixture was transferred to a separatory funnel containing 500 ml. of benzene which took up the phenylmercury salt almost immediately. The salt was found to be phenylmercury m-methylbenzoate.

The benzene layer was separated, filtered to remove any remaining solids, and evaporated to give the phenylmercury m-methylbenxoate as a damp crystalline solid. This solid was redissolved in xylene to provide a solution containing approximately 20% mercury in the form of the phenylmercury m-methylbenzoate. The solution so-obtained was filtered and analyzed for the concentration of phenylmercury salt remaining in solution by titration with a standardized solution of hydrogen bromide in acetic acid. The solution was found to contain about 14.6% mercury in the form of about 25.6 grams of phenylmercury m-methylbenzoate in 58.7 g. of xylene and thus is about 30.1% soluble in xylene at 25° C.

EXAMPLE 3

Phenylmercury o-methylbenzoate was prepared as follows.

A suspension of phenylmercury acetate (33.7 g., 0.1 mole) in 400 ml. of water was warmed to 75° C. and o-methylbenzoic acid (13.6 g., 0.1 mole) was added with stirring, and heating continued at temperatures within the range from 75 to 85° C. for about three hours. As the reaction proceeded, droplets or crystals of the aromatic acid and the phenylmercury acetate powder gradually disappeared and were replaced by heavy oil (or solid) at the bottom of the reaction vessel. At the end of the reaction period, the mixture was transferred to a separatory funnel containing 500 ml. of benzene which took up the phenylmercury salt almost immediately. The salt was found to be phenylmercury o-methylbenzoate.

The benzene layer was separated, filtered to remove any remaining solids, and evaporated to give the phenylmercury o-methylbenzoate as a damp crystalline solid. This solid was redissolved in xylene to provide a solution containing approximately 15% mercury in the form of the phenylmercury o-methylbenzoate. The solution so-obtained was filtered and analyzed for the concentration of phenylmercury salt remaining in solution by titration with a standardized solution of hydrogen bromide in acetic acid. The solution was found to contain about 15.1% mercury in the form of about 20.7 grams of phenylmercury o-methylbenzoate in 92.0 g. of xylene and thus is about 32.8% soluble in xylene at 25° C.

A mixture of 41.4 grams of phenylmercury o-, m-, and p-methylbenzoate was added to 58.7 grams of xylene to provide upon dissolution a solution containing 20% mercury. The solution was filtered and was found to contain 19.5% mercury and thus is about 40.7% soluble in xylene at 25° C.

When the same mixture of isomers was dissolved in 58.7 grams of aromatic naphtha to provide a solution containing 20% mercury, upon filtering the solution, it was found to contain 19.2% mercury and this is about 40% soluble in naphtha at 25° C.

EXAMPLE 4

Phenylmercury p-tert butylbenzoate one of the phenylmercury compounds of alkylaromatic acids of the invention was prepared as follows.

A suspension of phenylmercury acetate (33.7 g., 0.1 mole) in 400 ml. of water was warmed to 75° C. and p-tert-butylbenzoic acid (17.8 g., 0.1 mole) was added with stirring and heating continued at temperatures within the range from 75 to 85° C. for about three hours. As the reaction proceeded, droplets of crystals of the aromatic acid and the phenylmercury acetate powder gradually disappeared and were replaced by heavy oil (or solid) at the bottom of the reaction vessel. At the end of the reaction period, the mixture was transferred to a separatory funnel containing 500 ml. of benzene which took up the phenylmercury salt almost immediately. The salt was found to be phenylmercury p-tert-butylbenzoate.

The benzene layer was separated, filtered to remove any remaining solids, and evapoarted to give the phenylmercury p-tert-butylbenzoate as a damp crystalline solid. This solid was redissolved in xylene to provide a solution containing approximately 20% mercury in the form of the phenylmercury p-tert-butylbenzoate. The solution so-obtained was filtered and analyzed for the concentration of phenylmercury salt remaining in solution by titration with a standardized solution of hydrogen bromide in acetic acid. The solution was found to contain about 18.7% mercury in the form of about 40.0 grams of phenylmercury-p-tert-butylbenzoate in 54.3 g. of xylene and thus is about 42.4% soluble in xylene at 25° C.

The following examples illustrate paint compositions containing the anti-microbial additive in accordance with the instant invention.

EXAMPLE 5

| House paint, U.S. Govt. Spec. No. TT-P-40, Type I, Class A | Lb. | Gal. |
| --- | --- | --- |
| Anatase titanium dioxide | 95 | 2.72 |
| 75% leaded zinc oxide | 367 | 6.74 |
| Zinc oxide | 108 | 2.30 |
| Magnesium silicate | 100 | 4.22 |
| Linseed oil bodied to Z-2 viscosity | 110 | 18.70 |
| Raw linseed oil | 110 | 14.20 |
| Mineral spirits | 110 | 17.00 |
| Manganese naphthenate drier solution containing 6% manganese | 1.1 | 0.12 |
| Lead naphthenate drier solution containing 24% lead | 4.5 | 0.45 |
| Phenylmercury o-methylbenzoate solution containing 15% mercury | 15 | 1.5 |
| | | 62.95 |

EXAMPLE 6

Primer sealer, U.S. Govt. Spec. No. TT-P-56a

| | Lb. | Gal. |
|---|---|---|
| Rutile titanium calcium | 300 | 11.1 |
| Calcium carbonate | 400 | 17.4 |
| 67½% solids bodied fish-tung-soya oil mixture | 210 | 28.0 |
| Limed rosin solution | 136 | 17.0 |
| Mineral spirits | 182 | 28.0 |
| Cobalt naphthenate drier solution containing 6% cobalt | 0.5 | 0.05 |
| Lead naphthenate drier solution containing 24% lead | 1.0 | 0.10 |
| Phenylmercury m-methylbenzoate solution containing 15% mercury | 18.4 | 1.84 |
| | | 103.49 |

EXAMPLE 7

Architectural enamel, U.S. Govt. Spec. No. TT-E-506b

| | Lb. | Gal. |
|---|---|---|
| Rutile titanium calcium | 200 | 7.35 |
| Rutile titanium dioxide | 150 | 4.28 |
| Zinc oxide | 50 | 1.00 |
| Soya alkyd (70% N.V.) | 462 | 58.50 |
| Mineral spirits | 186 | 28.50 |
| Cobalt naphthenate drier solution containing 6% cobalt | 2 | 0.25 |
| Lead naphthenate drier solution containing 24% lead | 5 | 0.50 |
| Phenylmercury p-methylbenzoate solution containing 15% mercury | 15.6 | 1.56 |
| | | 101.94 |

EXAMPLE 8

Gloss enamel, U.S. Govt. Spec. No. TT-E-489, No. 120, Yellow

| | Lb. | Gal. |
|---|---|---|
| Medium chrome yellow | 325 | 10.5 |
| Fish oil alkyd (45%) | 441 | 60.0 |
| Soya alkyd (60%) | 160 | 21.2 |
| Mineral spirits | 49 | 7.5 |
| Cobalt naphthenate drier solution containing 6% cobalt | 2 | 0.25 |
| Lead naphthenate drier solution containing 24% lead | 5 | 0.50 |
| Phenylmercury p-tert-butylbenzoate solution containing 15% mercury | 14 | 1.4 |
| | | 101.35 |

EXAMPLE 9

Floor paint, U.S. Govt. Spec. No. TT-P-146

| | Lb. | Gal. |
|---|---|---|
| Lemon yellow oxide | 5 | 0.15 |
| Lamp black | 3 | 0.20 |
| Prussian blue | 1 | 0.10 |
| Rutile titanium calcium | 135 | 4.94 |
| Whiting (calcium carbonate) | 75 | 3.40 |
| Floor varnish | 520 | 70.00 |
| | | 78.79 |

| Floor varnish: | Lb. | Gal. |
|---|---|---|
| Modified phenolic resin | 100 | 10.0 |
| G-H dehydrated castor oil | 157 | 20.0 |
| Mineral spirits | 260 | 40.0 |
| Cobalt naphthenate drier solution containing 6% cobalt | 4 | 0.5 |
| Lead naphthenate drier solution containing 24% lead | 10 | 1.0 |
| Phenylmercury o-methylbenzoate solution containing 15% mercury | 15 | 1.5 |
| | | 73.0 |

Having regard to the foregoing disclosure, the following is claimed as the inventive and patentable embodiments thereof.

1. Phenylmercury salts of alkylbenzoic acids having the formula

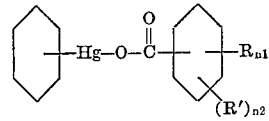

wherein R is an alkyl radical containing from one to about twenty-four carbon atoms, $n_1$ is an integer from one to five, R' is selected from the group consisting of halogen, acyloxy, and alkoxy radicals having from one to six carbon atoms and nitro groups, and $n_2$ is an integer from zero to four, the sum of $n_1$ and $n_2$ being a maximum of 5.

2. Compounds in accordance with claim 1 wherein $n_1$ is one and R is a t-butyl radical.

3. Compounds in accordance with claim 1 wherein $n_1$ is one and R is methyl.

References Cited

UNITED STATES PATENTS

| | | | |
|---|---|---|---|
| 2,059,195 | 11/1936 | Andersen | 260—434 |
| 2,074,040 | 3/1937 | Andersen | 260—434 |
| 2,724,643 | 11/1955 | Morris | 260—434 XR |
| 2,846,349 | 8/1958 | Erskine et al. | |

OTHER REFERENCES

Chemical Abstracts vol. 42, p. 2785d (1948).

DELBERT E. GANTZ, Primary Examiner

H. M. S. SNEED, Assistant Examiner

U.S. Cl. X.R.

106—15, 253; 260—22, 434

PO-1050
(5/69)

UNITED STATES PATENT OFFICE
CERTIFICATE OF CORRECTION

Patent No. 3,493,593           Dated February 13, 1970

Inventor(s) Otto S. Kauder

It is certified that error appears in the above-identified patent and that said Letters Patent are hereby corrected as shown below:

Column 1, line 14, "immisible" should be -- immiscible --;
Column 1, line 27, "benzillic" should be -- benzilic --;
Column 2, line 33, comma (,) to be inserted after "methyl";
Column 2, line 58, "isoamylzenzoic" should be -- isoamylbenzoic --;
Column 3, line 50, "o fthe" should be -- of the --;
Column 4, line 8, "meistylene" should be -- mesitylene --;
Column 4, line 16, "phenylmrecury" should be -- phenylmercury --;
Column 6, Table, Example 5, line 69, under heading "Gal.",
"18.70" should be -- 13.70 --.

SIGNED AND
SEALED

JUN 30 1970

(SEAL)
Attest:

Edward M. Fletcher, Jr.
Attesting Officer

WILLIAM E. SCHUYLER, JR.
Commissioner of Patents